United States Patent
Knodel

(10) Patent No.: US 8,342,318 B2
(45) Date of Patent: Jan. 1, 2013

(54) SUSPENSION DEVICE FOR SAUSAGE CHAINS

(75) Inventor: Peter Knodel, Oyten (DE)

(73) Assignee: VEMAG Maschinenbau GmbH, Verden/Aller (DE)

( * ) Notice: Subject to any disclaimer, the term of this patent is extended or adjusted under 35 U.S.C. 154(b) by 176 days.

(21) Appl. No.: 12/945,330

(22) Filed: Nov. 12, 2010

(65) Prior Publication Data

US 2011/0108391 A1 May 12, 2011

(30) Foreign Application Priority Data

Nov. 11, 2009 (DE) .................... 20 2009 015 265 U

(51) Int. Cl.
 *B65G 17/32* (2006.01)
(52) U.S. Cl. ........................... 198/683; 198/680; 452/51
(58) Field of Classification Search ............... 198/678.1, 198/680, 682, 683; 452/51; 226/2
 See application file for complete search history.

(56) References Cited

U.S. PATENT DOCUMENTS

| | | | | |
|---|---|---|---|---|
| 2,609,082 A * | 9/1952 | Leach | | 198/683 |
| 3,204,844 A * | 9/1965 | Wallace | | 452/51 |
| 3,552,620 A * | 1/1971 | Neubeck, Jr. | | 226/105 |
| 3,575,282 A * | 4/1971 | Gaiotto et al. | | 198/683 |
| 5,100,364 A * | 3/1992 | Kollross et al. | | 452/185 |
| 6,494,311 B2 * | 12/2002 | Muller | | 452/51 |
| 6,592,452 B1 * | 7/2003 | Myers | | 452/51 |
| 7,000,816 B1 | 2/2006 | Mikelsons et al. | | |
| 7,195,552 B1 * | 3/2007 | Johnson et al. | | 452/51 |
| 2009/0127072 A1 * | 5/2009 | Borkiewicz et al. | | 198/465.4 |

FOREIGN PATENT DOCUMENTS

| | | |
|---|---|---|
| DE | 10033494 A1 | 1/2002 |
| GB | 1495694 A | 12/1977 |

* cited by examiner

*Primary Examiner* — James R Bidwell
(74) *Attorney, Agent, or Firm* — Wood, Herron & Evans, LLP

(57) ABSTRACT

Suspension devices for suspending strings of sausages in loops. The suspension device may include hooks configured for carrying a loop of the string of sausages and a guide and drive device coupled with the hooks. The guide and drive device is configured for guiding and driving the hooks along a path of movement. The guide and drive device has a drivable circulating drive element for spaced receiving of the hooks and for driving the hooks. The suspension device may include a height-altering device that alters the height of the hooks during the movement of the hooks along the path of movement.

16 Claims, 5 Drawing Sheets

SUSPENSION DEVICE FOR SAUSAGE CHAINS

TECHNICAL FIELD

The invention concerns a suspension device for suspending strings of sausages in loops.

BACKGROUND

Small sausages are usually produced with known sausage filling machines in the form of long portioned sausage strings. In that case, two adjacent sausage cases are respectively separated from each other by a twist-off location. The filled and divided sausage cases are placed in loops and suspended from a suspension device known in the state of the art. A smoking bar or rod is pushed through the loops of the sausages, which are hanging in the suspension device. The string of sausages is then suspended in that form on a smoking cart, which is then moved into a smoker chamber.

While the suspension machine is operating, faults may occur, for example, due to so-called skin splits (defective sausage case or damage to the sausage case), by virtue of sausage cases of differing lengths, or the like disruptions. In response to a fault, the normal working process has to be interrupted and the defective sausages have to be stripped out of the string. The sausage case is knotted and thereafter the sausages can be subjected to further processing again in the proper fashion.

Known filling machines and accessory devices have a filling height of between about 1000 mm and 1200 mm. The suspension devices are generally adapted in respect of their height to the filling height of the filling machines and accessory devices, and in many cases that represents a very low working height for the operator of the suspension device.

Raising the filling machine and a corresponding accessory device and, thus, the suspension device is not really appropriate because the operating problem is only shifted as a result.

The use of intermediate belts to compensate for the working height is detrimental as the intermediate belts signify additional complication and expenditure, in regard to operation, maintenance, spare part stocking and demand for power.

SUMMARY OF THE INVENTION

The object of the present invention is to provide a device for suspending sausage strings, which in a simple fashion permits adaptation of the working height to filling machines of differing heights, in particular a change in the working height of the suspension device for the operator, and which reduces the above-mentioned disadvantages.

According to an embodiment of the invention, that object is attained by a device for suspending strings of sausages in loops comprising a guide and drive device for guiding and driving hooks along a path of movement, which has a drivable circulating drive element for spaced receiving and for driving a plurality of hooks, a plurality of hooks which are connected to the drive element for carrying a loop of the string of sausages, and a device for altering the height of the hooks during the movement of the hooks along the path of movement.

The suspension device according to this embodiment of the invention, which is equipped with a device for altering the height of the hooks during the movement, has the advantage that the working height of the suspension device can be easily adapted to the needs of an operator. That is advantageous, for example, when stripping out defective sausages, when wrapping around the freely hanging sausages or also when taking off the sausages with a smoking stick (lance).

In a preferred embodiment, the device for altering the height of the hooks has at least one guide rail, preferably a plurality of guide rails, along which a hook is additionally displaceable in respect of height, that is to say vertically, during the movement along the path of movement. In that way, the hooks can be easily displaced in respect of their heightwise position.

It is advantageous if the at least one guide rail can be fastened to at least one drive element, preferably to two drive elements, of the guide and drive device and is movable together therewith. That permits the suspension device according to an embodiment of the invention to be of a simple structure.

In a preferred embodiment, the at least one guide rail is oriented substantially vertically and perpendicularly to the path of movement of the hooks. Thus, the hooks are displaced vertically without their mutual spacing for further processing being changed.

Advantageously, the guide rail has two fixing elements which fasten the guide rail to the drive elements. In that way, the guide rail can be easily fastened to the drive elements, in particular in the form of belts.

The guide rail may have a lower sliding portion and an upper sliding portion which co-operate with an upper and a lower edge respectively of a wall of the guide and drive device in such a way that the guide rail is guided along the path of movement.

A particularly preferred embodiment provides that the device for altering the height of the hooks has a sliding link control, by means of which the hooks are vertically displaceable. In that way, a plurality of different curve/height configurations of the hooks can be easily set.

In a preferred embodiment, the sliding link control has a slot extending along a wall of the suspension device, and the hook has a fastening unit with a pin, the pin engaging into the slot. In that respect, it is particularly advantageous if the configuration of the slot along the wall of the suspension device has at least portion-wise a predefined and in particular constant gradient.

In an alternative embodiment, the sliding link control has a guide bar along the path of movement of the hooks and the hook has a fastening unit with a guide groove, the guide bar engaging into the guide groove. In that respect, it is particularly advantageous if the configuration of the guide bar along the path of movement of the hooks has at least portion-wise a constant gradient.

In an alternative embodiment of the suspension device, the device for altering the height of the hooks has at least one guide path which at least portion-wise has a constant gradient, wherein the drive element is guidable along the guide path.

In that respect for a simple structure of the device for altering the height of the hooks, it is advantageous if the hooks are fastened to the drive element, for example a chain.

BRIEF DESCRIPTION OF THE DRAWINGS

Preferred embodiments by way of example of the invention are described with reference to the accompanying drawings in which.

DETAILED DESCRIPTION

Figure 1:
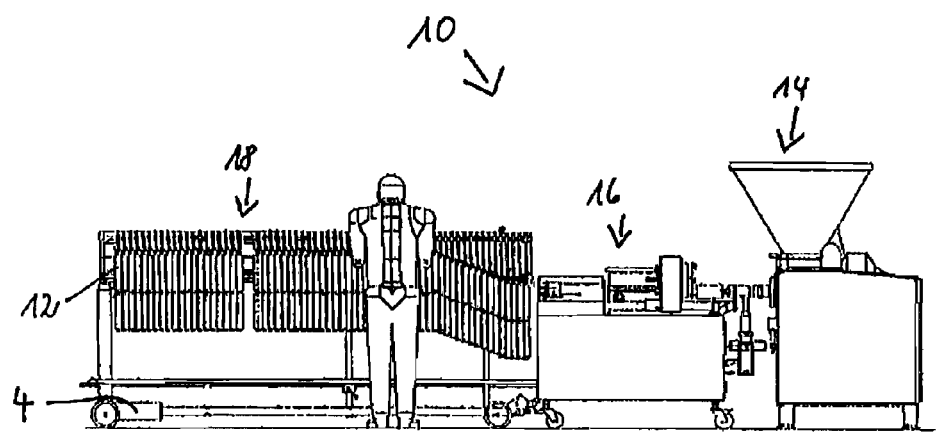
FIG. 1 is a side view of a machine for producing sausage articles comprising a filling machine, an accessory device and a suspension device in accordance with a first embodiment.

FIG. 1 shows a machine 10 for producing and processing sausage goods 12 comprising a filling machine 14, an accessory device 16, and a suspension device 18.

Figure 2:
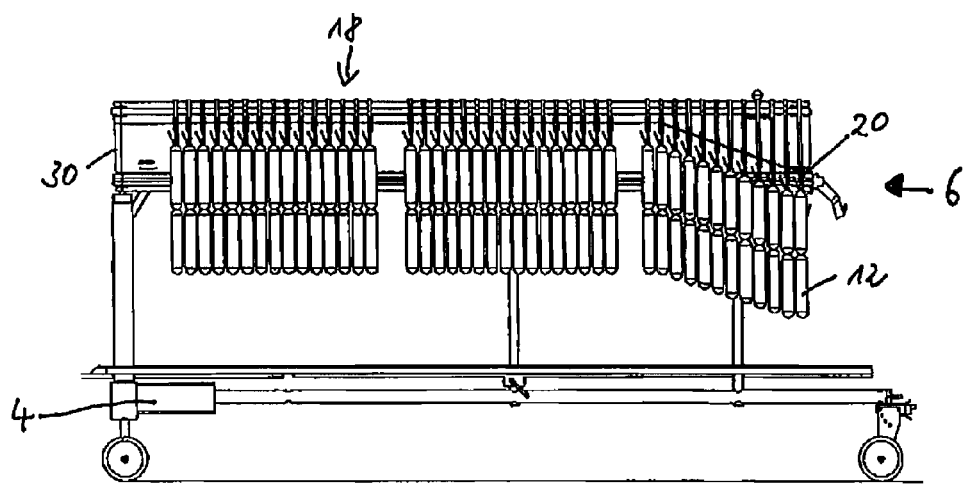
FIG. 2 is a side view of the suspension device of FIG. 1.

The sausage material is filled into a sausage case in known manner in the filling machine 14, and divided up. Then, the filled and divided sausage cases are suspended in freely hanging mutually juxtaposed relationship on a loop in the suspension device 18. For that purpose, as can better be seen from FIG. 2, provided on the suspension device 18 are hooks 20, on which the sausages can be hung.

The suspension device 18 according to the invention has a guide and drive device 6 for guiding and driving hooks 20 along a path of movement, having at least one drivable, circulating drive element 28a, 28b for spacedly receiving and driving a plurality of hooks 20. The hooks 20 connected to the drive element 28a, 28b serve for carrying a loop of the sausage string 12. The drive elements of the guide and drive device 6 are in the form of two mutually spaced belts 28a and 28b. Both belts 28a, 28b are driven in the same direction by a shaft 30, which is shown in FIG. 2 and which is driven by a motor 6 with a transmission.

The suspension device 18 further has a device 21 for altering the height of the hooks 20 during the movement of the hooks along the path of movement, that is to say for vertical displacement of hooks 20 substantially perpendicularly to the path of movement of the hooks 20, which is described in greater detail hereinafter. Each hook 20 arranged on the guide rail 24 by means of the fastening element 22 is displaceable substantially between two sliding portions 26a, 26b along the guide rail 24 in a vertical direction.

Figure 3:
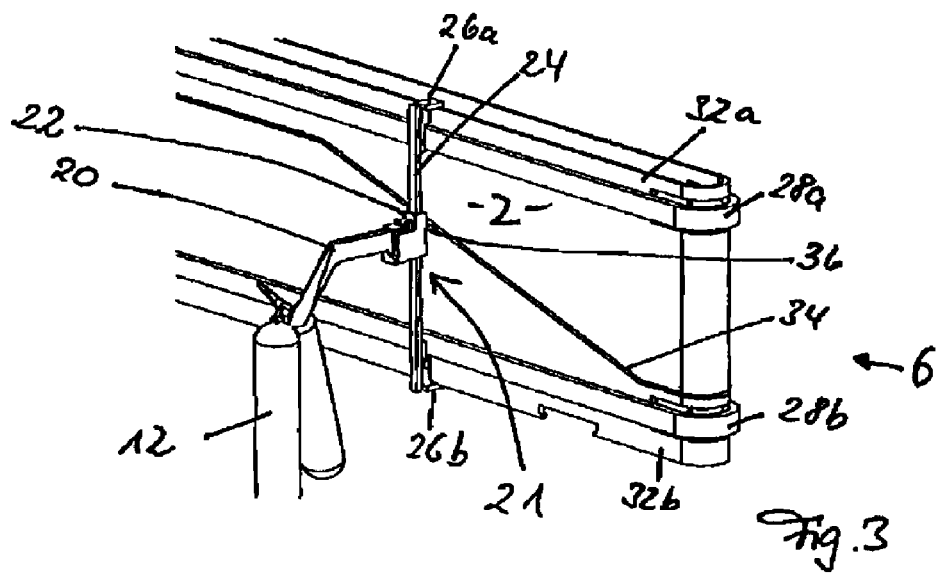
FIG. 3 is perspective view of a device for displacing the hooks in accordance with the first embodiment with one hook.

As can be seen from FIG. 3, each hook 20 is movably fastened to a guide rail 24 by means of a fastening element 22 and is displaceable along the guide rail. The guide rail 24 has, at each of its upper and lower ends, a respective lower and upper sliding portion 26a, 26b with a hook-shaped projection. The sliding portions 26a, 26b co-operate with an upper and a lower edge 32a, 32b, respectively of a wall 2 of the guide and drive device 6 in such a way that the guide rail 24 is guided with hooks 20 along the path of movement.

Disposed in adjacent relationship with the outer edges of the belts 28a, 28b is the respective upper and lower edge 32a, 32b of the wall 2 of the guide and drive device 6. The spacing of the upper and lower edges 32a, 32b or the length of the guide rail 24 respectively is so selected that a lower and an upper sliding portion 26a, 26b co-operate in positively locking relationship with the upper and lower edges 32a, 32b respectively in order slidably to fasten the guide rail 24 to the suspension device 18. In this case, the guide rail 24 is oriented substantially perpendicularly to the direction of movement, illustrated by the double-headed arrow, of the belts 28a and 28b and substantially vertically.

Figure 5:
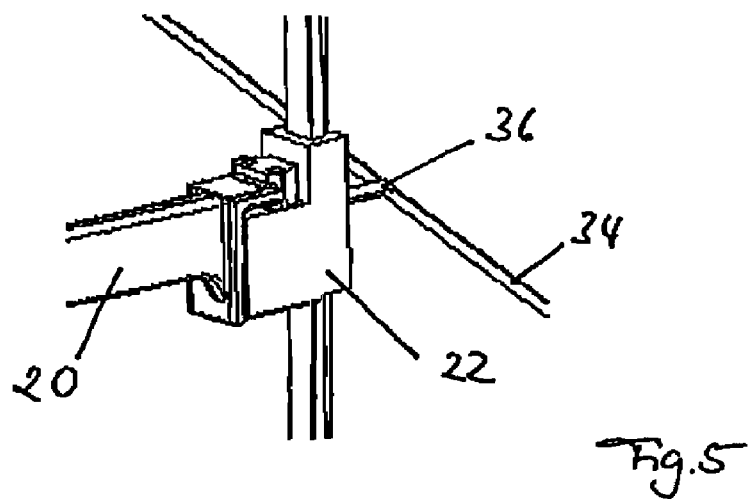
FIG. 5 is an enlarged view of a portion of FIG. 3 that details a sliding link guide of a hook.

A sliding link control is provided for controlling the vertical displacement of the hooks 20. The sliding link control includes a slot 34 in a wall of the suspension device 18 between the two belts 28a and 28b. As can best be seen from FIG. 5, a pin 36 on the fastening element 22 of the hook 20 engages into the slot 34. The slot 34 is portion-wise of a gradient which is constant but alternatively it may also be portion-wise different.

Figure 4:
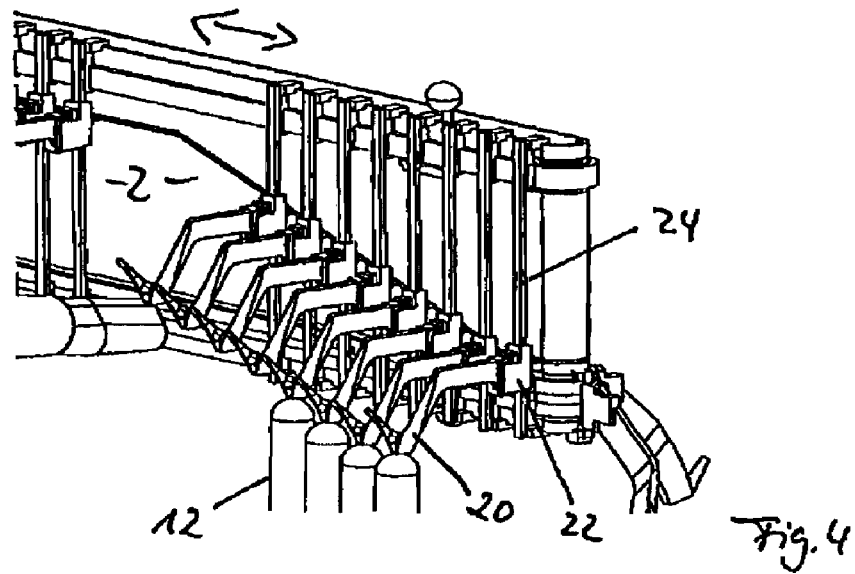
FIG. 4 is a perspective view of the device for displacing hooks of FIG. 3 in use with a plurality of hooks.

When the belts 28a, 28b move in a direction indicated by the double-headed arrow in FIG. 4 the hooks 20 are guided along the slot 34. When the hooks 20 pass into the region of the gradient of the slot 34, the hooks 20, in addition to the main direction of movement, are also displaced vertically along the guide rail 24. When the belts 28a, 28b move in the clockwise direction, the hooks are displaced upwardly along the guide rail 24 by virtue of the device for displacing the hooks 20. When the belts 28a, 28b move in the opposite direction, the hooks 20 are guided downwardly by virtue of the device for displacement of hooks 20, along the guide rail 24.

Figure 6A:
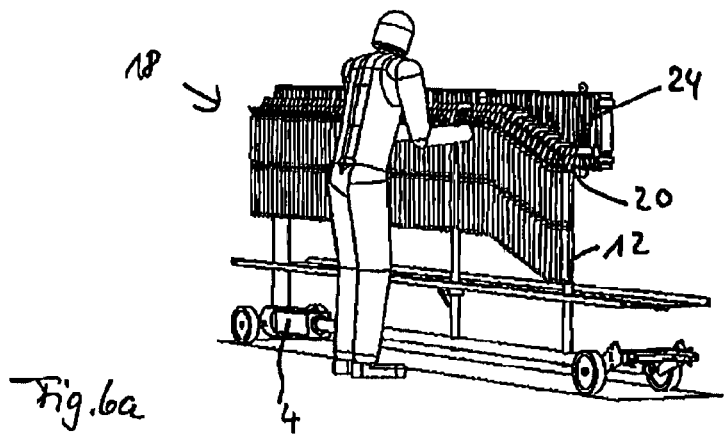
FIG. 6a is a perspective view of a first arrangement of a hook guide.
Figure 6B:
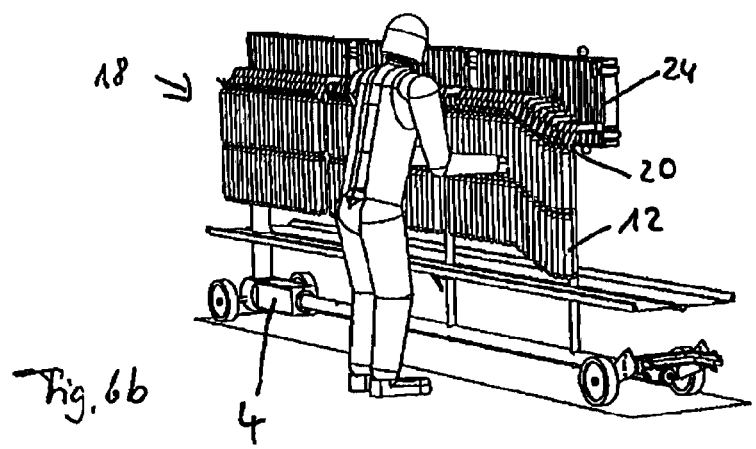
FIG. 6b is a perspective view of a second arrangement of a hook guide.
Figure 6C:
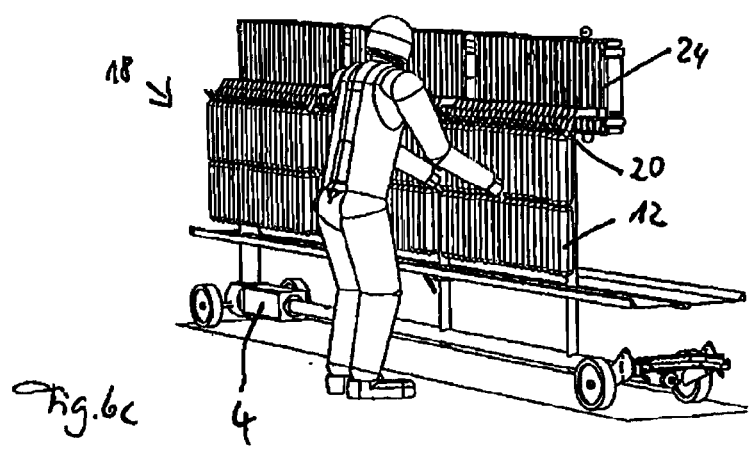
FIG. 6c is a perspective view of a third arrangement of a hook guide.

As can be seen from FIGS. 6a through 6c, the configuration of the slot 34 along the suspension device 18 and thus the guide curve for the hooks can be adapted to the needs wanted by the operator such as for example working height.

Instead of the slot in the wall, as an alternative, it is possible to use for example a guide bar which is arranged along the path of movement of the hooks and which presets the heightwise movement of the hooks. A slot, groove or the like can be provided on a hook, into which the guide bar engages. In that way, the hook is then guided along the guide bar during the movement in the suspension device. If the configuration of the guide bar has a gradient, the hooks can be displaced vertically when passing along the gradient.

It will be appreciated that, instead of the sliding link control, it is also possible to envisage other control arrangements in accordance with the present invention.

Figure 7:
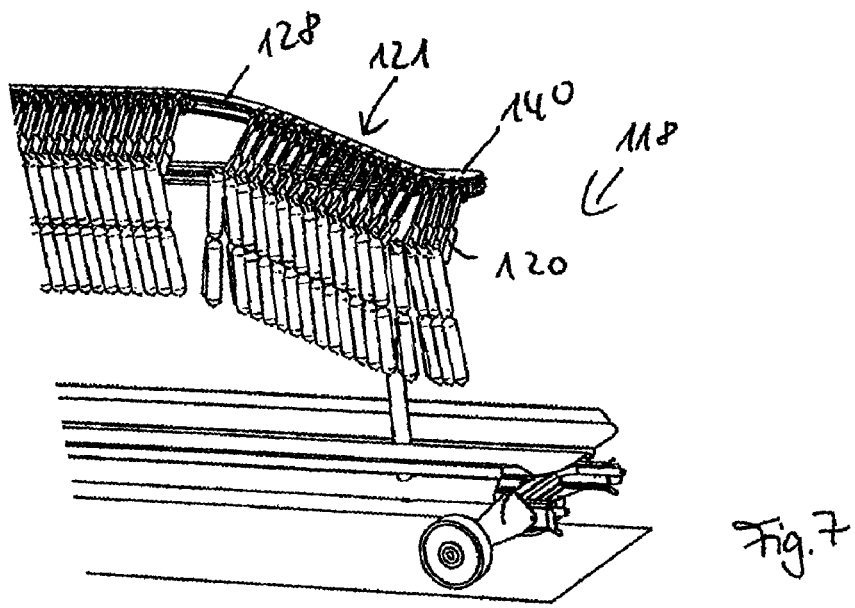
FIG. 7 is a perspective view of a suspension device in accordance with a second embodiment.
Figure 8:
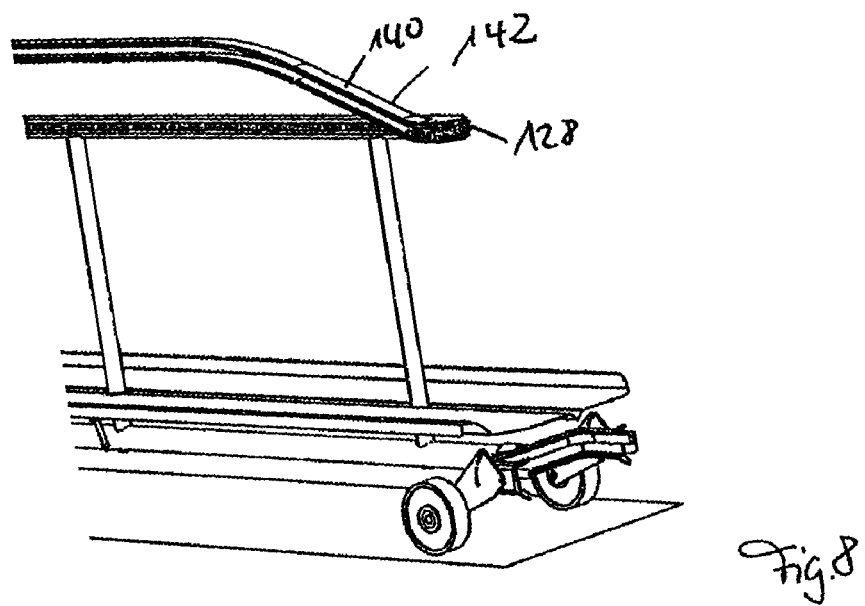
FIG. 8 is a perspective view of the suspension device of FIG. 7 in which a guide path is visible.
Figure 9:
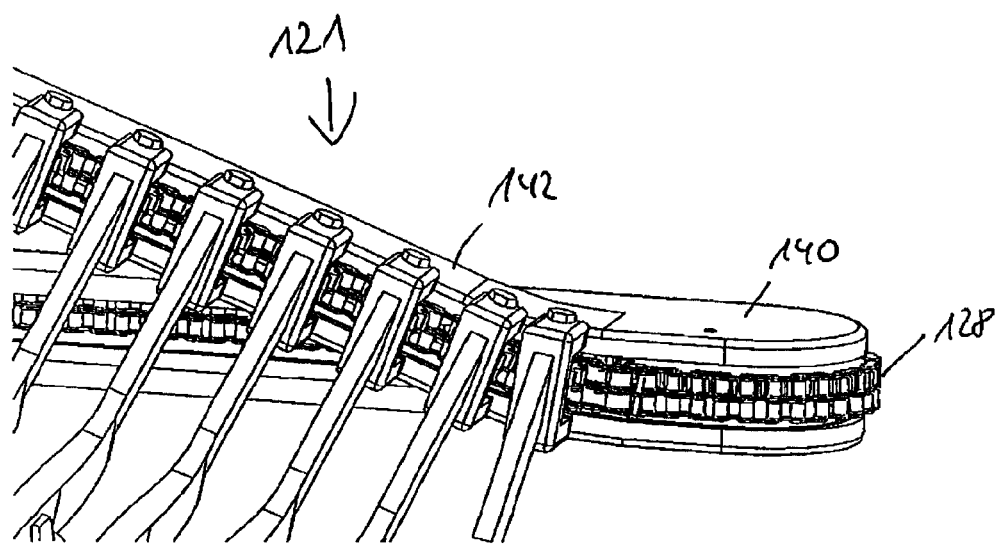
FIG. 9 is an enlarged view of a portion of the device of FIG. 7.

FIGS. 7 through 9 show an alternative embodiment of a suspension device 118. The device 121 for altering the height of the hooks 120 includes a substantially horizontally oriented guide path 140 which is of a rail configuration and which has a portion 142 with a rising gradient. A circulating drive element in the form of a chain 128 is guided along the guide path 140. The hooks 120 are fastened at a spacing from each other on the chain 128.

When the chain 128 is guided along the guide path 140, the hooks 120 fastened to the chain 128 are displaced upwardly in the portion 142 of rising gradient so that the hooks are displaceable in respect of height in that way. The degree of heightwise displaceability of the hooks 120 can be established by way of the degree and the length of the gradient in the portion 142 of rising gradient.

It will be appreciated that, instead of a guide path 140, it is also possible to envisage a plurality of guide paths for example with different degrees of gradient and different lengths of gradient to achieve different working heights for the hooks on a suspension device.

The invention claimed is:

1. A suspension device for suspending a string of sausages in a loop, the suspension device comprising:
    a plurality of hooks configured for carrying the loop of the string of sausages;

a guide and drive device coupled with the hooks, the guide and drive device configured for guiding and driving the hooks along a path of movement, the guide and drive device having a drivable circulating drive element for spaced receiving of the hooks and for driving the hooks; and a height-altering device that alters the height of the hooks during the movement of the hooks along the path of movement by a vertical displacement of the hooks substantially perpendicular to the path of movement of the hooks.

2. The suspension device of claim 1 wherein the height-altering device includes at least one guide rail along which each of the hooks is displaceable.

3. The suspension device of claim 2 further comprising:

a guide rail fastened to the at least one drive element and movable together therewith.

4. The suspension device of claim 2 wherein the at least one guide rail is oriented substantially vertically and perpendicularly to the path of movement of the hooks.

5. The suspension device of claim 4 wherein the guide rail has first and second fixing elements that fasten the guide rail to the at least one drive element.

6. The suspension device of claim 1 wherein the guide and drive device includes a wall with an upper edge and a lower edge, and the guide rail has a lower sliding portion and an upper sliding portion that respectively cooperate with the upper edge and the lower edge of the wall such that the guide rail is guided along the path of movement.

7. The suspension device of claim 1 wherein the height-altering device includes a sliding link control that vertically displaces the hooks.

8. The suspension device of claim 7 wherein the suspension device includes a wall, the sliding link control has a slot extending along the wall of the suspension device, and each of the hooks has a fastening unit with a pin that engages the slot.

9. The suspension device of claim 8 wherein the configuration of the slot along the wall of the suspension device has, at least portion-wise, a predefined gradient.

10. The suspension device of claim 9 wherein the predefined gradient is constant.

11. The suspension device of claim 8 wherein the sliding link control includes a guide bar along the path of movement of the hooks, and each of the hooks has a fastening unit with a guide groove, the guide bar engaging into the guide groove.

12. The suspension device of claim 11 wherein the configuration of the guide bar along the path of movement of the hooks has, at least portion-wise, a constant gradient.

13. The suspension device of claim 1 wherein the height-altering device includes at least one guide path that has, at least portion-wise, a constant gradient, and the drive element is guidable along the guide path.

14. The suspension device of claim 13 wherein the hooks are fastened to the drive element.

15. The suspension device of claim 14 wherein the drive element is a circulating chain.

16. The suspension device of claim 13 wherein the drive element is a circulating chain.

* * * * *